United States Patent
Jagst

[15] 3,660,866
[45] May 9, 1972

[54] APPARATUS FOR OPENING BALES OF TEXTILE FIBERS

[72] Inventor: Peter Jagst, Rheydt, Germany
[73] Assignee: Truetzschler & Co., Rheydt, Germany
[22] Filed: Jan. 19, 1970
[21] Appl. No.: 3,680

[30]         Foreign Application Priority Data
        Jan. 22, 1969    Germany ...................... P 19 02 951.7

[52] U.S. Cl. ............................................................19/81
[51] Int. Cl. ..........................................................D01g 7/06
[58] Field of Search ..................19/80, 81, 145.5; 241/101 A; 146/70.1

[56]           References Cited
              UNITED STATES PATENTS
1,545,367   7/1925   Tice ..........................................19/81
2,938,239   5/1960   Leineweber, Jr. et al. .................19/80

Primary Examiner—Dorsey Newton
Attorney—Burgess, Dinklage & Sprung

[57]            ABSTRACT

Improved textile fiber bale opening apparatus having a multiplicity of conveyor belts each of which is supported by two spaced rollers and is rotatable about the rollers in both, opposite directions; outwardly directed needle means on the surface of the conveyor belts adapted to penetrate a bale resting thereon; motive means to drive the conveyor belts; and control means at opposite ends of the total conveyor belt path operatively connected to the drive means, and operative in response to a bale reaching this path end, adapted to reverse the drive direction.

6 Claims, 1 Drawing Figure

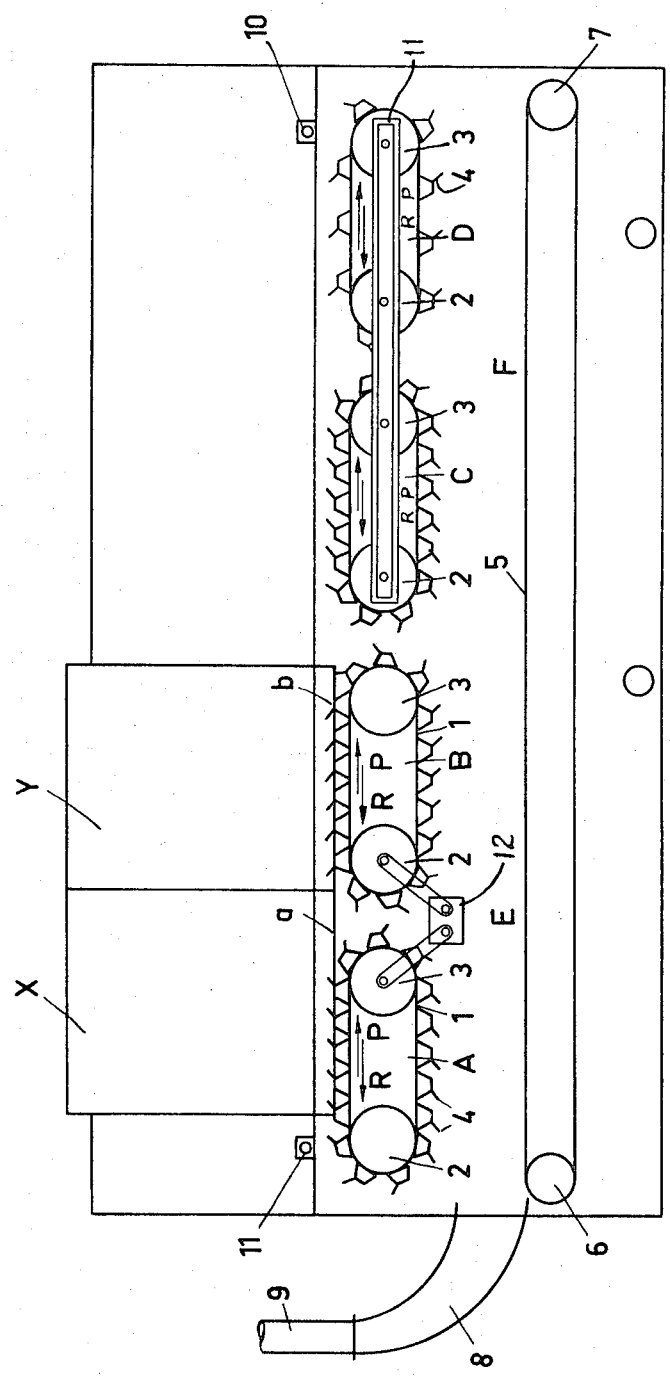

APPARATUS FOR OPENING BALES OF TEXTILE FIBERS

The invention relates to an apparatus for opening bales of textile fibers in which the fiber tufts pulled from a plurality of bales by the process are intermixed. It more particularly refers to an improved bale opening and mixing apparatus.

Until about 10 years ago, the opening of textile fiber bales and intermixing of the contents thereof were regularly performed with a series of bale opener-mixers arranged in tandem. An operator divided the bales into layers or chunks and placed these on a table of the bale opener-mixer, where they were opened up, and the tufts of fibers from all of the bale openers in a series were delivered to a common mixing belt. In this process it was difficult to achieve good mixture uniformity, and this uniformity was also dependent to a great extent on the reliability of the operator.

For this reason many textile machine manufacturers have developed and have been supplying automatic bale opening and mixing machines to the textile industry during the past 10 years. Such bale opening machines are usually designed so that a row of textile fiber bales placed one behind the other is moved back and forth by a plurality of aligned conveyor belts, over a plurality of bale opening devices located, in each case, between two adjacent conveyor belts. The said opening devices removed tufts of fibers from the bottom of the textile fiber bales and the tufts were delivered to a common mixing belt or were aspirated together from the bale opening stations. In these automatic bale opening machines, separate drives have been required for the conveyor belts and for the bale opening devices.

This invention is addressed to the problem of eliminating the disadvantage of multiple drive means and at the same time creating an especially simple bale opening machine of particularly high efficiency.

According to the invention, a bale opening machine of the above-described kind is modified so as to provide on the conveyor belts outwardly directed needle means of a length sufficient to penetrate the bales and of a thickness sufficient to withstand the rigors of operation. It is preferred that the needles be tilted from a position normal to the conveyor belt surface. Most preferably needles of adjacent conveyor belts are tilted in opposite directions. It is possible for the needles of adjacent conveyor belts to be spaced apart by different amounts.

Understanding of this invention will be facilitated by reference to the accompanying drawing which is a front elevation schematic view of the apparatus according to this invention.

Referring now to the drawing, four conveyor belts A, B, C and D are arranged in a row each composed of an endless band having needles protruding therefrom. Each belt corresponds approximately to the length of one bale, and each belt has a width which is somewhat greater than the width of a bale. The needle containing belt circulates around a driven roll 2 and a free roll 3. The driving 12 of all rolls 2 is synchronous. Both the direction of rotation of rolls 2 and their speed of rotation can be varied. The needles 4 are suitably about 35 mm long. All needles 4 are shown to be tilted from normal to the belt, in such a manner that they have an opposite tilt on adjacent belts.

The distance between adjacent conveyor belts, e.g., between belts A and B, can be varied by mutual displacement thereof. Underneath the row of conveyor belts A to D there is a fiber receiving belt 5 revolving between two rolls 6 and 7. An aspirating funnel 8, which leads to a suction duct 9, is provided at the one end of the said belt.

Two textile fiber bales X and Y are laid on the conveyor belts A and B. Then all four belts A to D are driven at equal speed in the same direction of the arrows P. In this manner, since the needles 4 penetrate into the bales, both of the bales X and Y are moved in the direction of the arrows P. Since the needles 4 of belt A, when they emerge from the bale X, i.e., at the point marked a, move downward with considerably greater velocity due to the belt turning about the roller 3, small tufts of fibers are torn from the bale X which then drop onto the fiber receiving belt 5 at a point E. In like manner, the needles 4 of the belt C tear fiber tufts from the bales Y and X respectively when such bales reach this belt, which fibers fall onto the receiving belt 5 at F. As soon as the bale Y has been carried to the right end of conveyor belt D, it cuts a light beam falling upon a photoelectric cell 10. The photoelectric cell 10 is in a circuit for the driving of rolls 2 of the conveyor belts A to D. As soon as the light beam no longer falls on the photoelectric cell 10, the drive means (not shown) of rolls 2 of all conveyor belts A to D reverses the direction of rotation of the conveyor belts. These conveyor belts then move the bales to the left, that is the bales X and Y are moved in the direction of the arrow R. The needles 4 of the conveyor belts B and D then tear fiber tufts from the bottom of the bales lying on them, and these tufts fall onto the receiving belt 5 at points E and F, until the bale X cuts the beam falling on a second photoelectric cell 11, whereupon the direction of movement of the conveyor belts are again reversed, so that they move in the direction of the arrows P. The fiber tufts dropped onto receiver belt 5 are sucked up by the aspirating funnel 8 into the duct 9, and from there they are carried conventionally to the next working stage. The size of the fiber tuft delivered onto the receiver belt 5 can be controlled by varying the length of the needles 4 and by varying the distance between the conveyor belts at points E and F by means of a spacer 11. The hourly output of the apparatus can be controlled by varying the speed of operation of the conveyor belts.

What is claimed is:

1. A bale opening apparatus comprising a multiplicity of bale supporting, aligned, endless conveyor belts, each belt being of a size sufficient to support a bale; drive means for moving all of said conveyor belts in the same direction at the same time whereby transporting bales from a conveyor belt to the next adjacent conveyor belt; control means operatively connected to said drive means controlling the direction of movement of said conveyor belts and causing the direction of movement of said conveyor belts to periodically reverse and a multiplicity of needle means directed outwardly of each conveyor belt of a length sufficient to penetrate bales supported on said conveyor belts and of a thickness sufficient to resist breakage wherein said needles are inclined from normal to said conveyor belts and where the needle inclination is in the opposition directions on adjacent belts; whereby said outwardly directed needles pluck fibers from bales resting on said conveyor belts as said conveyor belts drive said bales therealong.

2. The improved apparatus claimed in claim 1, wherein said belts are each endlessly disposed about two spaced rollers at least one of which rollers is driven by said drive means and wherein said control means is activated in response to said bales moving laterally to the outward extremity of said conveyor belts to reverse the direction of movement of said conveyor belts.

3. The improved apparatus claimed in claim 1, wherein the needles of adjacent conveyor belts are spaced apart a different amount.

4. The improved apparatus claimed in claim 1, including means for variable controlling the speed of said conveyor belts.

5. The improved apparatus claimed in claim 1, including a fiber receiving belt disposed below said conveyor belts to receive fibers plucked from said bales and including further transport means to convey said plucked fibers to additional textile processing equipment.

6. Improved apparatus claimed in claim 1, including means for varying the distance between said conveyor belts.

* * * * *